US005639429A

United States Patent [19]

Madronero de la Cal

[11] Patent Number: 5,639,429
[45] Date of Patent: Jun. 17, 1997

[54] REACTOR FOR THE PRODUCTION OF SHORT CERAMIC FIBERS FROM GAS

[75] Inventor: Antonio Madronero de la Cal, Madrid, Spain

[73] Assignee: Consejo Superior Investigaciones Cientificas, Madrid, Spain

[21] Appl. No.: 537,640

[22] Filed: Oct. 2, 1995

Related U.S. Application Data

[63] Continuation of PCT/ES93/00012, Feb. 24, 1993 and a continuation of Ser. No. 154,011, Oct. 22, 1993, abandoned.

[30] Foreign Application Priority Data

Feb. 24, 1992 [ES] Spain ................................. 9200402

[51] Int. Cl.$^6$ .................................................. C09C 1/44
[52] U.S. Cl. ........................ 422/155; 422/150; 422/152; 422/158; 423/447.1; 423/447.3
[58] Field of Search ........................ 219/390, 416; 373/109–112, 118; 422/150, 152, 155, 158, 174, 199; 423/447.1, 447.3, 448, 450, 458

[56] References Cited

U.S. PATENT DOCUMENTS

| 3,121,641 | 2/1964 | Wikswo et al. ............... 422/150 X |
| 4,014,980 | 3/1977 | Fujimaki et al. .............. 423/448 X |
| 4,318,894 | 3/1982 | Hensel et al. ................. 422/176 X |
| 4,565,684 | 1/1986 | Tibbetts et al. . |
| 4,749,557 | 6/1988 | Yetter et al. ................... 423/448 X |
| 4,770,867 | 9/1988 | Coulon et al. . |
| 5,024,818 | 6/1991 | Tibbetts et al. ................... 422/158 |
| 5,185,086 | 2/1993 | Kaali et al. ...................... 422/22 X |
| 5,304,366 | 4/1994 | Lorents et al. .................. 422/152 X |

FOREIGN PATENT DOCUMENTS

| 109165 | 5/1984 | European Pat. Off. . |
| 132909 | 2/1985 | European Pat. Off. . |
| 0214302 | 3/1987 | European Pat. Off. . |
| 222492 | 5/1987 | European Pat. Off. . |

OTHER PUBLICATIONS

"Aquamatic Impressed Current Cathodic Protection System Manual I.C.C.P." —Wilson Walton International S.A.E.
Lengths of Carbon Fibers Grown From Iron Catalyst Particles In Natural Gas (Journal of Crystal Growth 73 (1985) 431–438.
Graphite Intercalation Compounds (Materials Research Society (MRS) ) —Growth and Applications of Vapor–Grown Carbon Fibers—Morinobu Endo et al.
Vapor–Grown Carbon Fibers: Status and Prospects (Carbon vol. 27, No. 5, pp. 745–747).
Summary of Panel Discussion, "Carbon Fiber Industry: Current and Future" (Carbon vol. 27, No. 5, pp. 759–764).
Kokai Patent: 63–12720 (Jan. 20, 1988); Name of the Invention: Carbon Fibre Manufacturing Method by a Gaseous Phase Growth; Inventors: K. Okada and Cols. 4.
Patents Bulletion (A) S60–81318; Classification No. 7211–4L, 8417–4K; Publication: 9th May 1985; Name of the Invention: Equipment for Carbon Fibre Manufacture by a Thermal Decomposition Method.

(List continued on next page.)

*Primary Examiner*—Timothy McMahon
*Attorney, Agent, or Firm*—Darby & Darby

[57] ABSTRACT

The production of fibers is carried out by allowing a gas mixture containing a gaseous hydrocarbon or an appropriate gas to pass through a substrate (generally a steel sheet) arranged facing the direction of the gas stream and situated in a furnace wherein the gas reaches a temperature of 1.000° C. approximately. The schematized device is comprised of the corresponding gas reservoirs, that is to say the hydrocarbon gas and the carrying and activating gas, a mixing and preheating chamber, the furnace at the outlet of which are collected or burnt the inflammable gases and the grid from the surface of which, duly activated, the carbon fibers may grow. The gist of the invention is that the gas goes through the substrate situated facing the flow, so that said flow of gas is parallel to the direction of the fiber growth. The maximum length of the fibers is set by the distance between the substrate and a substrate or mask situated at the other extremity of the chamber.

16 Claims, 6 Drawing Sheets

OTHER PUBLICATIONS

Patent Kokai 1-92421; (Nov. 4, 1989); Application No. 62-246672; (Sep. 30, 1987); Name of the Invention: Manufacturing Method of a Carbon Fibre by Growth 1 a Gaseous Phase; Inventors: Endo and Cols. 5.

Tensile Strength of Carbon Fibres Grown From Gas Hydrocarbons; A. Madronero; Possibilities and Perspectives of Carbon Fibres Produced by a Decomposition of Gas Hydrocarbons, by A Madronero De la Cal. And
Cenium 0790; Preparation of Microscopie Carbon Fibres by the Vapour Phase Method; Jap. Pat. 61-34221 (Feb. 18, 1986).

REACTOR FOR THE PRODUCTION OF SHORT CERAMIC FIBERS FROM GAS

This is a continuation of international application Ser. No. PCT/ES93/00012, filed Feb. 24, 1993 and a continuation of application Ser. No. 08/154,011, filed Oct. 22, 1993 now abandoned.

BACKGROUND OF THE INVENTION

1. Field of the Invention

Apparatus especially adapted to the manufacture of carbon filaments (DQ1F.)

Manufacture of carbon fibre from hydrocarbons.

DESCRIPTION OF THE RELATED ART

Carbon fibres are used as a reinforcing element in the manufacture of materials composed of a polymeric, metallic or ceramic matrix. The level of characteristics of the composites depends, aside from other aspects such as amount of reinforcement included, direction of the fibre, etc., on the quality of the fibre, that determines the price thereof.

Consequently, the composites that should be produced at a moderate cost (for inexpensive products and a large market volume, such as seats, frames, etc.) are restricted to the use of only low price fibres, such as fibre glass.

High usage fibres, such as silicon carbide, aramide and carbon fibres are limited to use in those very high usage composites (aerospace industry and Defense industry, that may allow high costs.

Therefore, it is of the utmost interest to achieve the production of high usage fibres at a more affordable price. In this sense a lot of research has been done and, above all, regarding carbon fibre.

The carbon-graphite fibre concept covers a broad range of ceramic fibres of pure graphite from a chemical point of view, but with an ample variation with regard to the degree of graphitization thereof and the structure-properties relationship. Basically there are three big families:

i) ex-PAN carbon-graphite fibre, having such a name as it is manufactured from polyacrylonitrile (PAN) textile thread or rayon textile thread, which is roasted and pyrolized until only the strongly texturized skeleton of the graphite framework of the starting polymer or precursor remains. Basically by the energy consumption that the manufacture thereof implies, it is practically impossible to lower the price thereof; it is the typical fibre of the composites for aeronautics and space vehicles.

ii) ex-PITCH carbon-graphite fibre, having such a name as it is manufactured from pitch or tar, to which additives are added to stimulate the formation of a "mesophase." In a pasty state, the pitch is formed into a thread and then it is subjected to pyrolization treatment such as conventional graphite. The mechanical characteristics thereof are due to the reduced grain size of the graphite processed in this way. There was a time when it was thought that this ex-Pitch fibre was going to be the carbon fibre that was going to replace exPAN fibre due to the lower cost thereof, but the only types of high usage ex-Pitch fibres correspond to Young high modulus fibres and very reduced breakage elongation, thus the potential market thereof is very small.

iii) Unlike the two previous families, which have been available on the free market for quite some time, VGCF (Vapour Growth Carbon Fibres) are still in the laboratory-pilot plant stage and constitute the hopes of industries such as the automobile industry that is never going to be able to afford the cost of ex-PAN and ex-PITCH carbon-graphite fibres.

The production process thereof simply consists of the production of lamp black in which the special necessary precautions are taken so that the product becomes filamentous, just as it has been done in the manufacture of whiskers, no matter how much controversy there is about the physics-chemical mechanisms that control the formation of these fibres. The process consists of using some tiny metallic particles, which acting as seeds, receive all the carbon coming from the decomposition of the hydrocarbon and take on the form of filaments.

The experimental system for growing these fibres is extensively described in the bibliography (see G. G. Tibbetts "Vapour grown carbon fibers," Chapter of the book: J. L. Figueiredo et al. (Editors) "Carbon fibres filaments and composites" Kluwer Academic Publishers (1990) pag. 7394; F. Benissad, P. Gadelle, M. Coulon and L. Bonnetain "Formation de fibres de carbone a partir du methane: i. Croissance catalytique et epaisseissement pyrolytique" Carbon, vol. 26 (1988) pag. 61–69; G. G. Tibbetts "From catalysis to chemical vapor deposition: graphite fibers from natural gas" Paper read at the Graphite Intercalation Compounds Congress organized by The Materials Research Society, Boston (USA) November 1984; M. Endo and H. Ueno "Growth and applications of vapor-grown carbon fibres" Paper read at the Graphite Intercalation Compounds Congress organized by the Materials Research Society, Boston (USA) November 1984.) A quartz tube inside of which, at temperatures slightly above 1000° C. some finely ground transition metal seeds are placed, in an atmosphere of a mixture of hydrogen (that may be accompanied by CO), and a gaseous hydrocarbon, is used. The carbon is adsorbed by the metallic particles and the excess are given off in the form of carbonous filament.

Basically, there are two techniques to produce VGCF, in a fixed bed, wherein the seeds are very still and the only thing that moves is the mixture of reactive gases (the fibres are generated and grown fixed to the substrate or pan), and in a fluidized bed, wherein the seeds are drawn by the gases (just like wind which draws dust particles) while they are growing (M. Endo, A. Katoh, T. Sugiura and M. Shiraishi, "High resolution electromicroscopy on vapour-grown carbon fibres obtained by ultra-fine fluid catalyst" Paper read at the 18th. Biennial American Conference on Carbon. Worchester 1987). The VGCF which both techniques produce, are identical, though generally the fibres coming from the fixed bed have an average length slightly longer than fibres produced in a fluidized bed.

The two big difficulties, not yet overcome, which have hampered manufacturing on an industrial scale of VGCF (despite the large bibliography existing, VGCF have not come onto the free market at a commercial scale), are:

i) very short length ii) very small amount of fibre produced per operating hour

The matter of fibre length is very restrictive, from the point of view of the short fibre sector market. There are manufacturing processes of composites, that are widely used, which require short fibre, but with a certain minimal length. Thus, for example, the SMC (Sheet Moulding Compound) process, by means of which some many automobile bumpers are manufactured, requires short fibres of approximately 2.5 cm.

In the case of fixed bed systems, which are capable of producing longer VGCF, the bibliography (F. Benissard, P.

Gadelle, M. Coulon and L. Bonnetain "Formation de fibres de carbone a partir du methane. TTI: Influence de la nature du precurseur du catalyseur." Carbon, vol. 27 (1989) pag. 585–592; G. G. Tibbets "Length of carbon fibres grown from iron catalyst particles in natural gas" Journal of Crystal Growth, vol. 73 (1985) pag. 431–438) indicates to us that the average length of 1.5 mm. cannot be exceeded. The only document which cites that this fibre length is greatly exceeded is patent (14) the Komaki et al. Japanese Patent No. 60-81318 (see below), wherein the length of 75 mm. is said to be achieved, though there is no explanation as to whether this length refers to the average length of the fibres obtained in a batch, or if (that which is most probable), the length of a few exceptionally long fibres appearing in the substrate or pan is referred to.

Looking for the quickest possible fibre production, the studies seeking the industrial production of VGCF, the fluidized bed systems, which produce fibre lengths of only 500 μm (patent 17), 5 μm 15 mm. are usually chosen. The following list of patents, which we refer to by the numbers in parenthesis, consider these processes:

(1) VAPOUR GROWN CARBON FIBRE MANUFACTURE
Authors: M. Endo, T. Okada, M. Ishioka, K. Nakazato, Y. Okuyama and K. Matsubara
Applicant: Nippon Kokan K.K.
Patent No. at the Patent Office in Tokyo: 01 92425 (89/92425)
Application date: 30 Sep. 1987
Patent application: 87/246178

(2) LOW COST VAPOUR PHASE GROWN CARBON FIBRE MANUFACTURE
Author: M. Endo, M. Ishioka, T. Okada, K. Nakazato, Y. Okuyama and K. Matsubara
Patent No. at the Patent Office in Tokyo: 01 92423 (89/92423)
Application date: 30 Sep. 1987
Applicant: Nippon Kokan K.K.
Patent application: 87/246174

(3) LOW COST VAPOUR PHASE GROWN CARBON FIBRE MANUFACTURE
Author: M. Endo, T. Okada, M. Ishioka, K. Nakazato, Y. Okuyama and K. Matsubara
Patent No. at the Patent Office in Tokyo: 01 92420 (89/92420)
Application date: 30 Sep. 1987
Patent application: 87/246171

(4) VAPOUR PHASE GROWN ULTRAFINE CARBON FIBRE MANUFACTURE
Author: M. Nakatini and Y. Komatsu
Applicant: Asahi Chemical Industry Co. Ltd.
Patent No. at the Patent Office in Tokyo: 63 282313 (88/282313)
Application date: 15 May 1987
Patent application: 87/116663

(5) VAPOUR PHASE GROWN ULTRAFINE CARBON FIBRE MANUFACTURE
Author: M. Nakatini and Y. Komatsu
Applicant: Asahi Chemical Industry Co. Ltd.
Patent No. at the Patent Office in Tokyo: 62 282020 (87/282020)
Application date: 26 May 1986
Patent application: 86/120789

(6) VAPOUR PHASE GROWN ULTRAFINE CARBON FIBRE MANUFACTURE
Author: A. Furuichi and Y. Komatsu
Applicant: Asahi Chemical Industry Co. Ltd.
Patent No. at the Patent Office in Tokyo: 62 288819 (87/268819)
Application date: 15 May 1986
Patent application: 86/109606

(7) CARBON FIBRE MANUFACTURE
Author: Y. Komatsu and K. Nakamura
Applicant: Asahi Chemical Industry Co. Ltd.
Patent No. at the Patent Office in Tokyo: 61 225321 (86/225321)
Application date: 23 May 1985
Patent application: 85/58812

(8) VAPOUR PHASE GROWN CARBON FIBRE MANUFACTURE
Applicant: Showa Denko K.K.
Patent No. at the Patent Office in Tokyo: 61 194223 (86/194223)
Application date: 22 Feb. 1985 Patent application: 85/32817

(9) VAPOUR PHASE GROWN CARBON FIBRES MANUFACTURE
Author: H. Ito and K. Murata
Applicant: Mitsui Engineering and Shipbuilding Co. Ltd.
Patent No. at the Patent Office in Tokyo: 01 104834 (89/104834)
Application date: 15 Oct. 1987 Patent application: 87/260139

(10) VAPOUR PHASE GROWN CARBON FIBRE MANUFACTURE USING LASER RADIATION
Author: K. Murata, K. Sato and M. Matsumoto
Applicant: Mitsui Engineering and Shipbuilding Co. Ltd.
Patent No. at the Patent Office in Tokyo: 01 85320 (89/85320)
Application date: 28 Sep. 1987
Patent application: 87/243292

(11) VAPOUR PHASE GROWN CARBON FIBRE MANUFACTURE USING LASER RADIATION
Author: K. Murata, K. Sato and M. Matsumoto
Applicant: Mitsui Engineering and Shipbuilding Co. Ltd.
Patent No. at the Patent Office in Tokyo: 01 85321 (89/85321)
Application date: 28 Sep. 1987
Patent application: 87/243293

(12) CARBON FIBRE MANUFACTURE
Author: M. Murakami and S. Yoshimura
Applicant: Research SS Development Corporation of Japan
Patent No. at the Patent Office in Tokyo: 61 55220 (86/55220)
Application date: 24 Aug. 1984

(13) MANUFACTURING CARBON FIBRES FROM A GASEOUS HYDROCARBON
Author: Y. Komatsu
Applicant: Showa Denko S.A.
European patent No.: 86901499.3 (WO 86/04937) Publication date: 28 Aug. 1986

(14) APPARATUS FOR THE MANUFACTURE OF CARBON FIBRE BY THE THERMAL DECOMPOSITION METHOD

Author: K. Komaki and M. Watanabe

Applicant: Showa Denko S.A.

Patent No. at the Patent Office in Tokyo: 60 8138 Publication date: 9 Jun. 1983

(15) GASEOUS PHASE GROWN CARBON FIBRE MANUFACTURING METHOD

Author: K. Okada et al.

Applicant: Nippon Kokan Kabushiki, Tokyo Patent no. at the Patent Office in Tokyo: 63-12720, application no. 61-150838 Publication date: 20 Jan. 1988

(16) GASEOUS PHASE GROWN ULTRAFINE CARBON FIBRE MANUFACTURE

Author: S. Marimoto

Applicant: Showa Derrico K.K.

Patent No. at the Patent Office in Tokyo: 63 92726 Application date: 1 Oct. 1986

Patent application: 86/233758

(17) GASEOUS PHASE GROWN CARBON FIBRE MANUFACTURING METHOD

Authors: M. Endo, M. Ishioka, K. Nakazato, T. Okada, Y. Okuyama and K. Matsubara Applicant: Nippon Kokan K.K. Tokyo Patent No. at the Patent Office in Tokyo: 62-246172

Application date: 30 Sep. 1987

Patent application: 87/246172

(18) PREPARATION OF MICROSCOPIC CARBONATED FIBRES BY A VAPOUR PHASE METHOD

Author: K. Arakawa

Applicant: Nikkiso Co. Ltd. Tokyo

Patent No. at the Patent Office in Tokyo: 60 81138 (EP 84109710.8 and EP 85103297.8)

Application date: 27 Jul. 1984

(19) PROCESS FOR THE MANUFACTURE OF DEPOSITED CARBON FIBRES FROM METHANE

Author: M. Coulon, N. Kanctani-, L. Bonnetain and J. Maire

Applicant: Le Carbon Lorraine

International Patent No.: EP 8505383

Publication date: 5 Dec. 1985

(20) IMPROVED PROCESS FOR GRAPHITE FIBRE GROWTH

Author: J. R. Bradley, J. M. Burkstrand and G. G. Tibbetts

European Patent No.: 83306001.5 (EP 109165)

Application date: 4 Oct. 1983

(21) METHANE PYROLYSIS PROCESS

Author: G. G. Tibbetts and M. G. Devour

Patent Nos.: U.S. Pat. No. 642,574 (20 Aug. 1984), U.S. Pat. No. 685,046 (21 Dec. 1984), ES 546,245 (19 Aug. 1985)

(22) FERRIC NITRATE TREATMENT FOR NUCLEATION OF GRAPHITE FIBRE GROWTH BY MEANS OF METHANE PYROLYSIS

Author: G. G. Tibbetts

Applicant: General Motors Corporation

European Patent No.: 843020243.9 (EP 132909)

Application date: 13 Feb. 1985

(23) STIMULATION BY MEANS OF PRESSURE PULSES OF GRAPHITE FIBRE GROWTH

Author: G. G. Tibbetts

Applicant: General Motors Corporation

European patent no.: 86307589.1 (WO 222492)

Application date: 2 Oct. 1986

On the other hand, there are very few options for the fixed bed (patents (12), (14) and (18)), though they obtain lengths of 100 $\mu m<1<500$ $\mu m$ (in patent (12)), 2 mm$<1$ $<3$ mm (in patent 18)), etc.

Therefore, it can be said, that in broad outline, the options of a fluidized bed tend to produce "crashed fibre" (hardly one millimeter long), while the possibilities of manufacturing "short fibre" (longer than 5 mm) are potentially attainable by a fixed bed, but improving with future research the efficiency of the equipment described in the above cited bibliography.

The other key issue, the production speed of VGCF during the manufacturing process, is likewise restrictive. Thus, for example, in patent (13), 6.5. g of fibre are said to be achieved after 5 hours of production in a fluidized bed, while using a fixed bed, in patent (14) 2.5 g are said to be attained in 5 hours of production in a fluidized bed, while using a fixed bed, in patent (14) 2.5 g are said to be attained in 5 hours of production in a fluidized bed, while using a fixed bed, in patent (14) 2.5 g are said to be attained in 5 hours of operation (with the additional remark that in conventional systems, that are not specifically indicated, the production is of 1.8 g. in the same amount of time.)

We understand that the R+D efforts in this technology should be directed towards solving both aspects.

SUMMARY OF THE INVENTION

Figure 1:
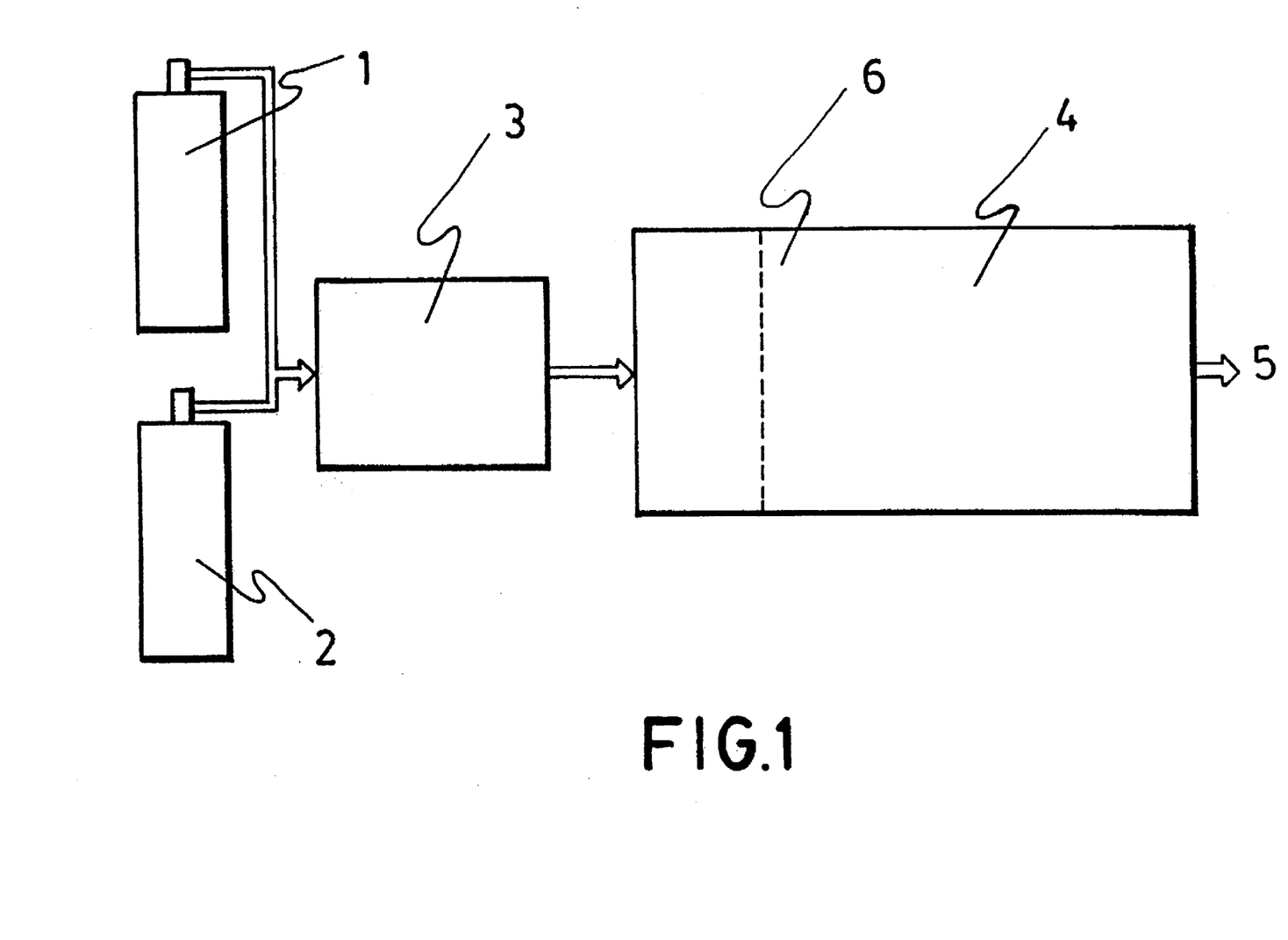
FIG. 1 is a schematic view of the reactor according to the present invention.
Figure 2A:
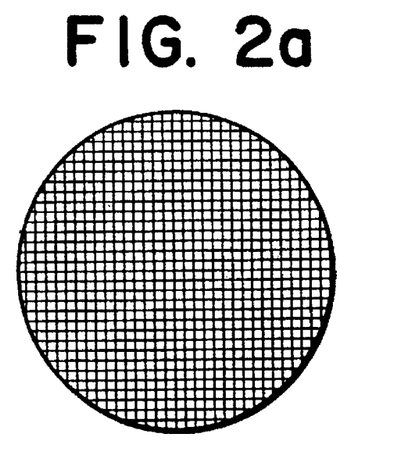
FIGS. 2a–2d illustrate the substrates according to the present invention.
Figure 2B:
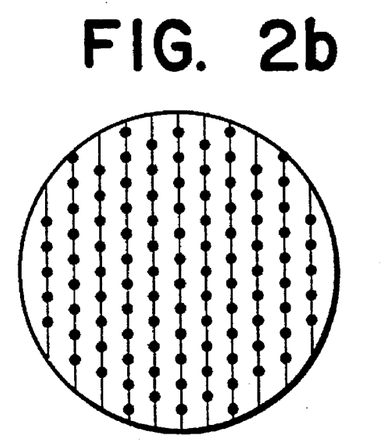
Figure 2C:
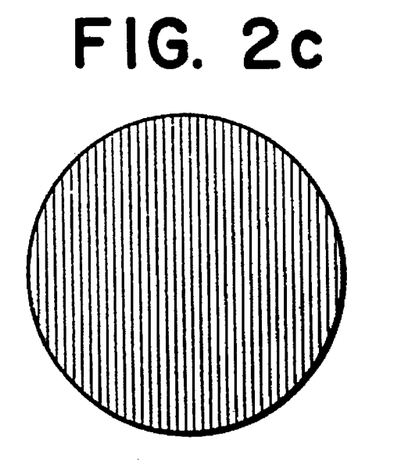
Figure 2D:
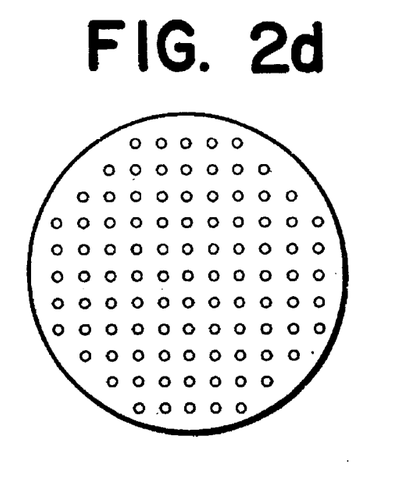

As is seen in FIG. 1, the obtainment of relatively long ceramic fibres by pyrolysis or reduction of suitable gases (hydrocarbons when carbon fibres are to be obtained, hydrogen-silicon chloride-hydrocarbon mixtures when silicon carbide fibres are to be obtained, etc.), is achieved by passing a gaseous mixture through a substrate (6) (in principle steel wire fabric or mesh) placed frontally to the direction of the gas stream and placed in an oven (4) where the gas reaches a temperature around 1000° C. The device, schematized in cited FIG. 1, consists of the corresponding gas tanks (1) Hydrocarbon tanks and (2) carrier and activator gas or gases, a mixing and preheating chamber (3), the cited oven (4) at % whose outlet (5) the inflammable gases are collected or destroyed and the screen (6) from whose duly activated surface, the carbon fibres grow.

Starting from the fact that stainless steel is indicated in the bibliography as suitable material upon which fibres can grow, in principle (and without this being restrictive) stainless steel can be used to manufacture the substrate, which in accordance with the present invention, and as is shown in FIG. 2, can be A stainless steel wire metallic mesh with a suitable opening size An adequately thick steel sheet disk in which suitably sized holes are perforated.

With these substrates it is achieved that the seeds that are formed do so separate from each other. For this purpose a conventional technique consisting of the disks, once they are cleaned, degreased and sickled with diluted hydrochloric acid, are seeded, applying some brush strokes of an alcohol solution of, for example, ferrid nitrate ($Fe(NO_3)_3$ can be used.

The operating conditions of temperature, composition of the mixture and required time, are conventional. The operating temperature is, preferably 1065° C. and the reactive atmosphere 85% hydrogen with 15% methane; the operating time is one hour.

The essential aspect of the invention is that the gas passes through the substrate located frontally to the flow, so that upon this flow (in which turbulences should be avoided) being parallel to the direction of growth of the fibres, the fibres can attain a length of up to 10 to 12 cm. with a thickness of 4 to 15 μm.

In the tips of the fibres, due to the required flow, the gas is renewed from the surroundings of the active end thereof, maintaining it with the entire methane content, that permits the continuity of the growth thereof.

In view of industrial production, it is convenient to reduce the opening size of the mesh (or the size of the holes) until the maximum coverage of the cross-section of the oven is achieved, leaving enough free space such that, without obstructions the stream of reactive gases that will feed the VGCF fibre growth, will pass through. It will also be interesting to place the maximum number possible of pans-substrates, so that in the useful cylindric-tubular space that the reactor-oven constitutes, the largest possible number of fibres are produced simultaneously.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various Figures are utilized to designate like components, and wherein.

DETAILED DESCRIPTION OF THE INVENTION

As it has been indicated in FIG. 1, the device consists of a chamber (3) for preheating and homogenizing the mixture, which though it is not an essential part of the invention, from a practical point of view, it is essential for the purpose of saving energy and reducing the time required to reach the operating temperature.

Neither the geometry of the oven (unless it is tubular) nor the heating system is an essential part of the invention. Due to the easy adjustability thereof, electric heating is advisable. Heating by electric energy consumption allows for two equally valid variants, Joule effect heating and induction heating. In the first case, it takes longer to reach the operating temperature, and in the second case the equipment cost is higher.

The simplest way to eliminate residual gases is done by burning them in a torch when, as usual, operating is done at atmospheric pressure; if there is a desire to vary this pressure, instead of in the torch they would be put in a sealed container with an adjusted pressure escape (pressure higher than atmospheric pressure), or a vacuum pump (pressure lower than atmospheric pressure.) In any case, it is convenient to point out the following:

i) in all that which refers to dimensions, they basically depend on the production capacity provided for. The gas flow must be such that its linear speed (reducing its volume to normal conditions) is between 2 and 16 cm $min^{-1}$.

ii) the substrates, which in principle may be the ones indicated in FIG. 2, can, in the strict meaning of the word, be used indistinctly in the Joule effect heating system as well as in the induction heating system. However, this subject will be dealt with hereinafter in greater detail.

iii) an essential improvement lies on the specialization of the supports in substrates and "masks." There is really no clear distinction between both concepts, since the two systems can be included in a single piece as it has been indicated up to now (FIG. 1.) It is simply that some geometries, corresponding to the ones that we associate with the concept of "mask", a word which indicates in an abbreviated form a "passive adjustment mask" consisting of a thin wall, with perforations made for this purpose, which due to their simple location opposite the stream of reactive gases, tends to improve the regularity and laminarity of the flow of gases. These masks play an important role as distributors-uniformers of the flow of gases inside the oven-reactor, having on the other hand very little effectiveness as generating trays of VGCF or fibers of another type of ceramic material, though hereinafter we are going to limit ourselves to VGCF, which are the ones most frequently used. Consequently, a very favorable option is to choose, as in the case of FIG. 4, an input-substrates-substrate "mask and/or output "mask" pan sequence, so that the intermediate sub-produce the maximum VGCF, but this is an advantageous option, not a requirement.

Figure 3:
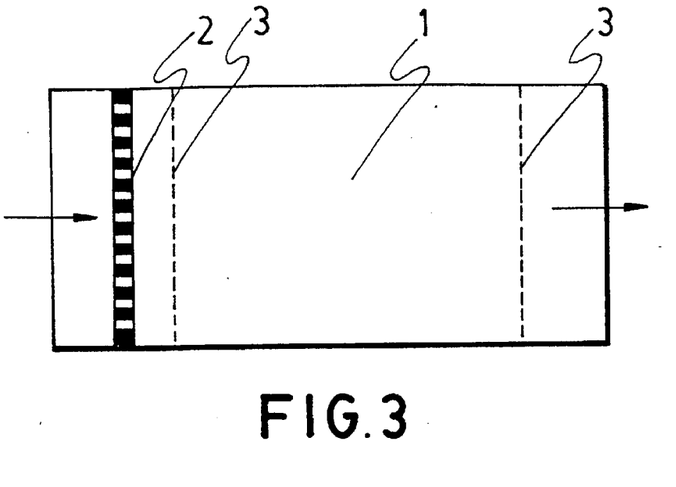
FIG. 3 shows the basic unit.

In this sense, in FIG. 3, what we could call the basic unit of the invention is seen. This unit can be repeated a specific number of times as is observed in FIG. 4. At the input of the oven (1) it is very convenient (but not necessary) to have the mask (2) whose basic task is to regularly distribute the gas before it enters the substrate (3) where the carbon fibres are formed. Given that in a unit the hydrocarbon content of the gaseous mixture is not used up, this can pass on to the second unit and from the second unit to the third unit, etc. At the end of the last series of cascaded substrates, it is very convenient that there is a second mask (2) instead of a substrate, so that the turbulences that can be produced in the gas as a result of the strangulation at the output do not affect the laminar flow in the last unit, are avoided.

Figure 4:
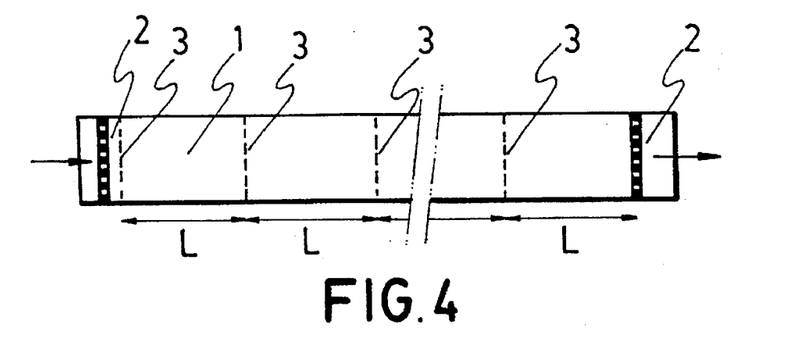
FIG. 4 shows another embodiment of the unit illustrated in FIG. 3.
Figure 5:
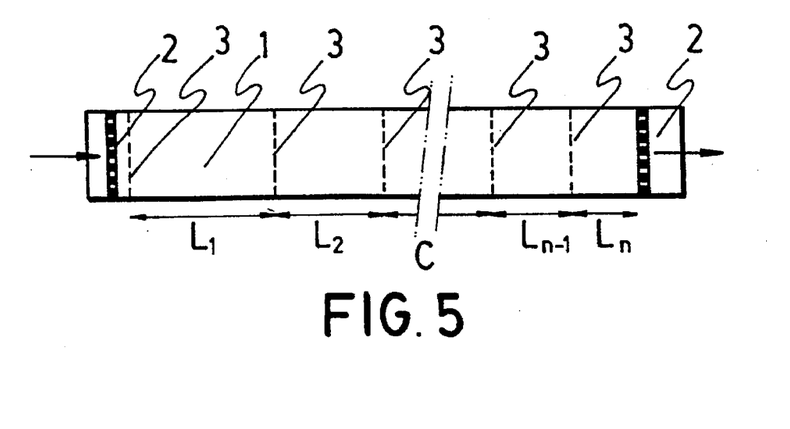
FIG. 5 shows another embodiment of the unit illustrated in FIG. 3.

There is another optional aspect that can be seen by comparing FIGS. 4 and 5. In the first one, length, L, of each unit is the same, while in the second one it is different, reducing in the direction of movement of the gas.

The reason is the following. When the mixture of reactive gases reaches the second substrate (which we will call S2), it is somewhat weakened since part of its carbon potential has been discharged in the feed of the growth of VGCF grown on the first substrate, S1. Consequently, after, for example, twenty minutes of operation, substrate S1 is populated with VGCF with an average length L, while the fibres grown on S2 have an average length shorter than L. Therefore, between the end of the fibres grown on S2 and the subsequent substrate S3 there is wasted space. Therefore, it is logical to place the substrates with a progressively smaller separation.

This does not mean that equidistant substrates can not be used. If, for example, the substrates are placed equidistant at 6 cm., logically a situation in which the VGCF grown on S1 would be reached, as a length of 6 cm. has been attained, their ends would much substrate S2, which would cause their growth to stop. If the operation is now prolonged, the fibres grown on S2 begin to grow more rapidly, since now an atmosphere richer in hydrocarbons reaches them. Once the fibres grown on S2 reach substrate S3, a subsequent prolongation of the operating time permits the fibres grown on S3 to touch substrate S4 and so on.

In other words, one has the liberty to choose between fibres of a single size, which correspond to the situation of equidistant substrates and fibres with some graduated sizes, according to corresponding decreasing values of L. In the first case, the oven can be as long as desired, with an operating time that increases with its length. In the second case, the length of the operation can be minimized.

DESCRIPTION OF THE SUBSTRATES

In the present description the word "substrate" is used to define an object upon which growth of the fibre takes place. The substrate is a support that either due to its own nature or because "seeds" are provided to it (the seeds will be referred to hereinafter) permits said growth.

Figure 6A:
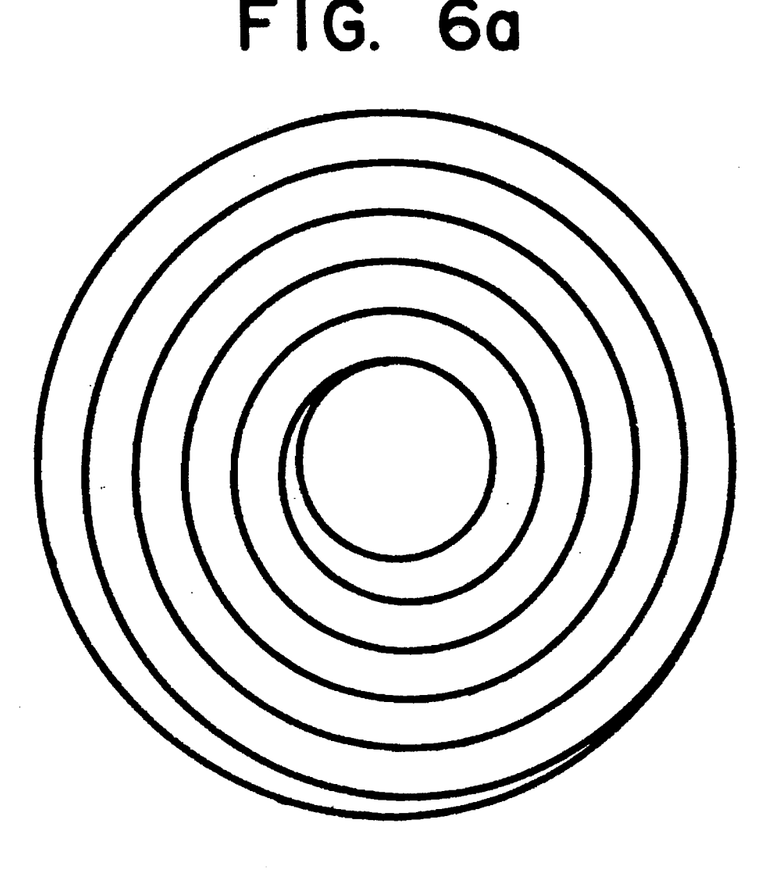
FIGS. 6a and 6b show a substrate formed by a spiral wound wire.
Figure 6B:
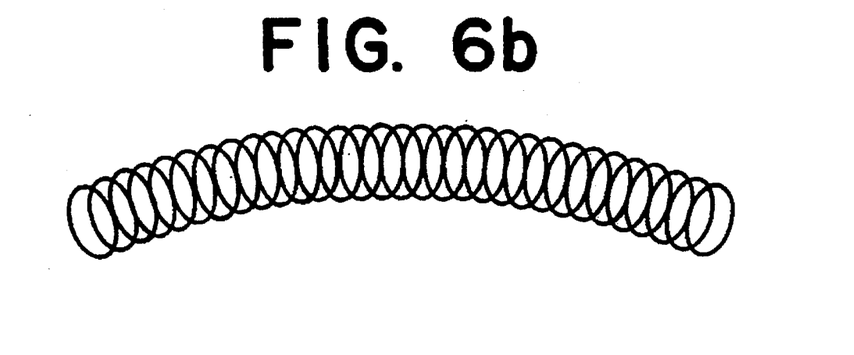

In FIG. 2 different geometric forms that can be given to the substrates, whose periphery has been drawn circular assuming that it has to adapt to a cylindrical frame has been shown, but they could also have another shape, for example, square. FIG. 6 shows a different type of substrate formed by a spiral wound wire, to which, optionally, a second spiral of finer wire as shown in the bottom part of the Figure may in turn be would around this.

For example, in order to manufacture the latter, a wide range of metallic materials can be used with the sole requirements that they endure the operating temperature (between 600° and 1300° C.) without deteriorating or losing shape (none rust because the oven operates with a reducing atmosphere.) Base alloys Co, No, W and ferro-alloys, heat-resisting steels and stainless-heat-resisting steels are especially appropriate and they can be used in the qualities that are normally used in trade, VITALIUM®, NICHROME®, KHANTAL®, STELLITE®, commercial pure wolfram, etc. VITALIUM is a composition comprising: 0–0.5 C; 0–0.6 Si; 0–0.75 Mn; 5–7 Mo; 28–32 Cr; balance Co.;

NICHROME is a composition comprising: 0.38–0–43 C' 0.7–0.9 Cr; 1.65–2.00 Ni; 0.2–0.3 Mo; balance Fe.;

KHANTAL is a composition comprising: 23.4 Cr; 6.2 Al; 1.9 Co; 0.06 C; balance Fe.;

STELLITE 100, is a composition comprising: 34 Cr; 19 W; 2 C; balance Co.

In order to form the substrates 3 illustrated in FIG. 4, the alloys pointed out for the substrate of FIGS. 6a and 6b can be used, or else any of the graphite board available in commerce for high temperature joints can be used (normal brands CARDBOARD® of the finn Ashland in the USA and PAPYREX® manufactured in Francy by Le Carbonne Lorraine.) The spiral substrate of FIGS. 6a and 6b can comprise a first spiral wound wire about which a second timer wire can be wound. In other words, the first wire acts as a frame about which the second timer wire is wound.

In order to manufacture the substrate of the type of FIG. 2, any quality ceramic material may be used, alumina, mullite, silicon carbide, etc. In this case it is very convenient that the grooves or perforations have toothed edges, that improve the fertility of the substrate since they stimulate the accumulation of the tiny seeds.

The substrates can be used directly, in direct contact with the wall of the oven (which in this case acts as a frame), though it is preferable to use them wrapped in a steel wire tubular element.

MASKS

The mask, as it has already been defined (passive wall with flow adjustment perforations, located frontally to the direction of the flow) constitutes a perforated screen whose task is to provide a redistribution of the flow of gases to make it more uniform and regular and it must be placed, as seen in FIGS. 3, 4 and 5, at the input and output of the gas. Use thereof is very convenient but it is not an essential part of the invention.

Figure 7A:
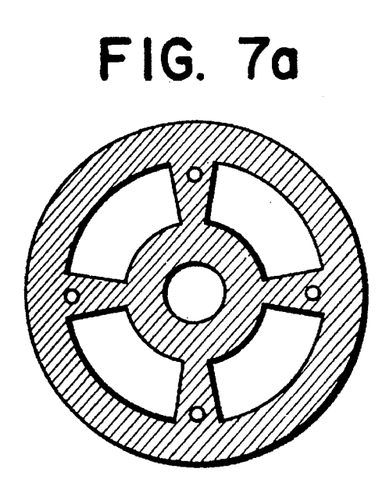
FIGS. 7a, 7b and 7c show various embodiments of masks.
Figure 7B:
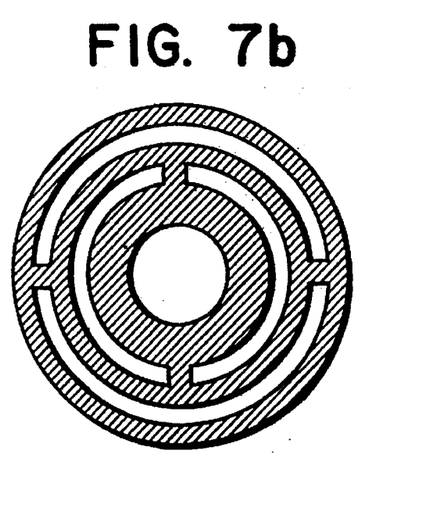
Figure 7C:
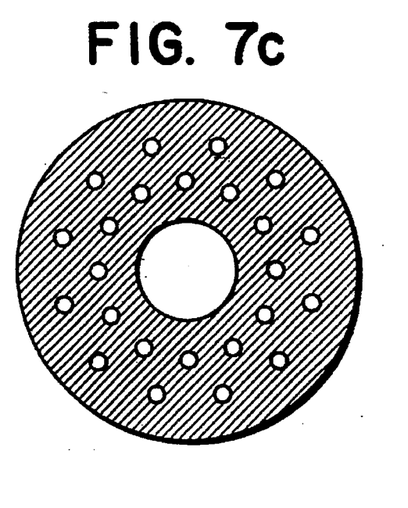

In FIGS. 7a, 7b and 7c, different forms of masks with which goods results have been obtained are shown. Of course, these shapes can be varied without this affecting the essence of the invention.

They may be manufactured indistinctly out of the above cited graphite board or any other of the metallic or ceramic materials pointed out above.

Preparation of Seeds and Mixtures for Reactive Gases

The use of certain substances that act as the germ to start the formation of the fibre which is essential for carrying out the invention is not a part of the same. Thus, here we will limit ourselves to gather the information disclosed in the bibliography concerning this subject, some already pointed out, as well as that which refers to mixtures of gases and operating temperatures.

i) Preparation of the seeds—In accordance with the techniques described, the following families of substances can be used as compounds whose reduction give rise to catalytically active seeds for this manufacturing.

i.1) organometallic compounds, especially advisable to form sees that give rise to very fine fibres (thickness <4 µm.)

i.2) inorganic transition metal salts, especially appropriate (iron salts) to form fibres with an intermediate thickness (3 µm<$\varnothing$<7 µm), or to form thick fibres (double anion salts) with a thickness of 5 µm<$\tilde{O}$<20 µm.

Cr and Ni ferrocene, thiocene, metallocene, (Fe, Ni, Cr and Co) oxalates can be cited among organometallic compounds. Among inorganic salts we can indicate nitrates, nitrites, sulfates (and ammonium sulfates) and chlorides (along, mixed and with additions such as potassium and sodium hydroxide.) The same salts of Zr, V, W, Mo, Mn, Pd, Tr and Pt can also be used but less effectively. The dilution margins of each one are very broad and not very significant in their results; as a general rule it can be said that they are used in concentrations between 50% and 80% of the saturation concentration.

ii) Mixture for reactive gases—As to the composition of reactive atmospheres, it is always a mixture of reducing gas and of gaseous hydrocarbon, the latter being in a proportion of 5 to 40%.. Pure hydrogen, which is the best option from a functional point of view, can be used, or to reduce costs, hydrogen with added CO, noble gases, carbon dioxide and $SH_2$ can be used. Practically all alkanes, such as methane, ethane, propane and butane can be used as hydrocarbons;

alkenes, such as ethylene, butadiene, etc.; alkynes, such as acetylene, etc.; aryl hydrocarbons, such as benzene, toluene, styrene, etc.; condensed ring aromatic hydrocarbons, such as indene, naphthalene, phenanthrene, etc.; cycloparaffins, such as cyclopropane, cyclohexane, etc.; cycloolefins such as cyclopentene, cyclohexene, etc.; condensed ring alicyclic hydrocarbons, such as steroids, etc.; sulfurated aliphatic compounds such as methylthiol, methyl-ethylic sulfide, methyl ethyl sulfide, dimethylthioketone, etc.; sulfurated aromatic compounds, such as phenytrol, diphenylsulfide, etc.; sulfurated heterocyclic compounds such as benzothiophenone, thiophenone, etc. A simple kerosene or benzene can be used perfectly, as long as they are adequately vaporized.

The structure and properties of the fibres produced depend very little on the hydrocarbon chosen, thus, the choice tends to be based on costs, degree of toxicity and hazard of use, process time, etc.

iii) Operating temperatures—As to the operating temperatures for the production of VGCF, the recognized margins are 600° to 1300° C., the optimal range being 900° to 1200° C.

EXAMPLES

Example No. 1

Figure 8:
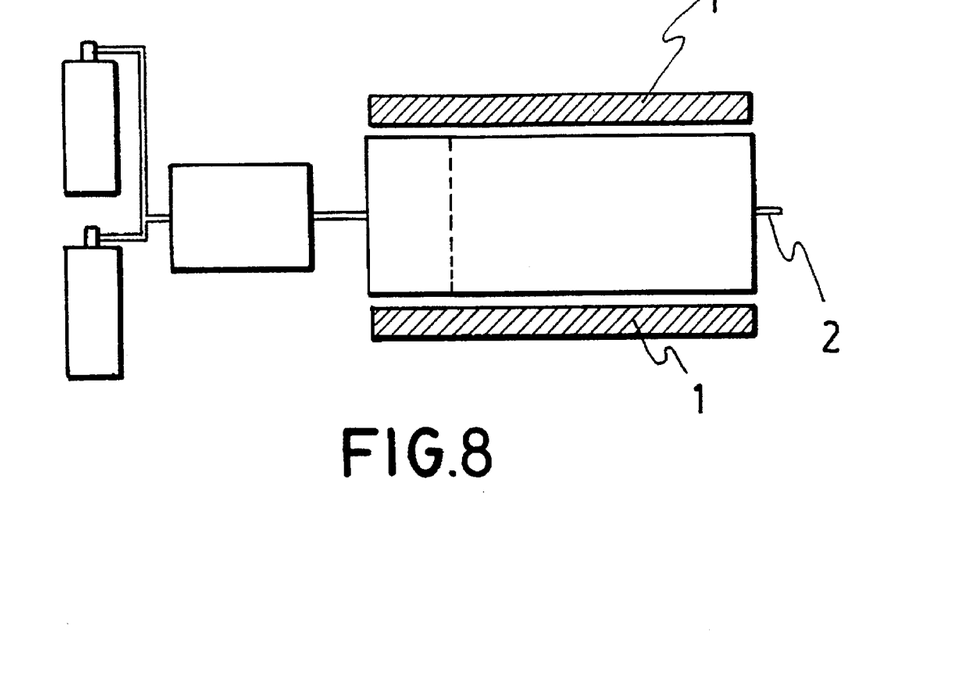
FIG. 8 shows the dimensions of the unit.

The dimensions of the fundamental device are given in FIG. 8.

Example No. 2

Figure 9:
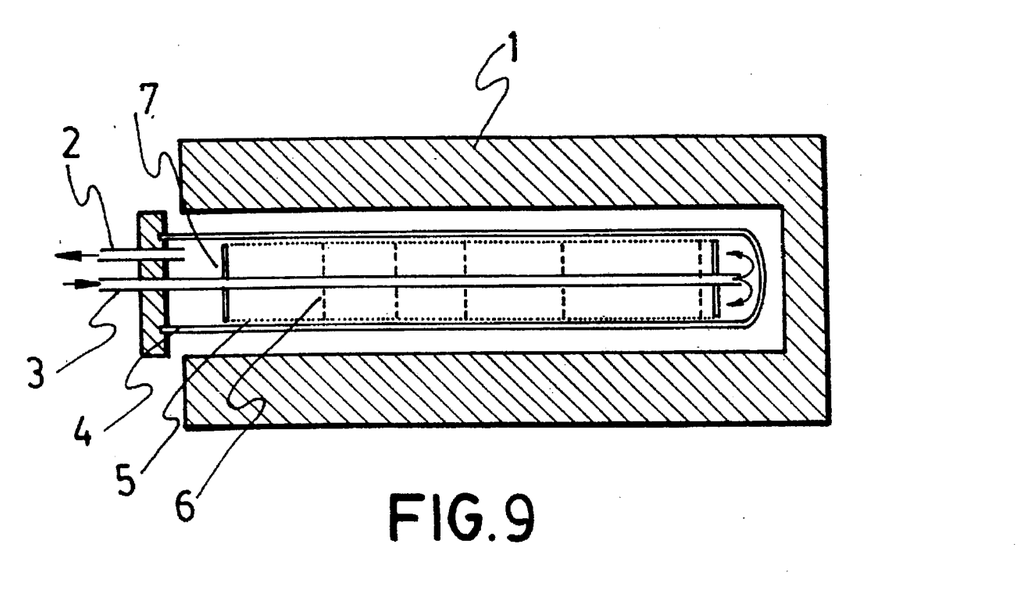
FIG. 9 shows a reactor according to the present invention.

The reactor with various compartments of decreasing length in the direction of the flow is shown schematically in FIG. 9. The operating conditions are the following:

Joule effect heating

Input mask, which appears in the top part of FIG. 7, made of graphite board

Output mask, which appears in the bottom left-hand side of FIG. 7, made of 18/8 stainless steel sheet Four substrates like those of FIG. 6, made (the fine wire as well as the thick wire) of Khanthai A® (CoSi alloy). a very usual material for making electric resistors. The separation distances are furnished in the Figure All the substrates were seeded coating them with a small brush dipped in al alcohol solution of iron nitrate 60% saturation at room temperature Operating temperature 1065° C.

Operating cycle. A preheating process was started (only the propane flame of the preheater was used as an energy supply) with only Ar (600 dm³/min.) at a temperature increasing to 800° C.; the preheating time lasted 15 minutes. Then, the electric energy control was turned on setting the reference temperature at 1065° C., setting the preheater at 650° C. and cutting off the entry of Ar, introducing hydrogen only for five minutes. Afterwards the operating stage itself takes place for 20 minutes, the atmosphere being 88% $H_2$ and 12% $CH_4$ The operation ends with cooling with Ar.

The results are given in TABLE I.

As it can be seen, in the four substrates a similar fibre density is obtained, since the amount of fibres obtained in proportional to the length of the same. If the operating time were extended, longer fibres in the final substrates would have been attained, whereby the production in grams of fibres would have increased a bit.

TABLE I

| | Fibres grown on the substrate | | | |
|---|---|---|---|---|
| | $S_1$ | $S_2$ | $S_3$ | $S_4$ |
| Average length in cm. | 6.1 | 5.0 | 3.0 | 1.5 |
| Average thickness in μm | 4 a 7 | 5 a 7 | 5 a 7 | 5 a 7 |
| Amount produced in g. | 0.078 | 0.058 | 0.041 | 0.014 |
| Total 0.191 g | | | | |

Example no 3

Just like in the previous example, solely changing the use of a ammonium ferrous sulfate solution as the seed, which gives rise to thicker fibres although they have the same structure. The results obtained are given in TABLE II.

TABLE II

| | Fibres grown on the substrate | | | |
|---|---|---|---|---|
| | $S_1$ | $S_2$ | $S_3$ | $S_4$ |
| Average length in cm. | 6.6 | 5.0 | 3.2 | 1.8 |
| Average thickness in μm | 5 a 11 | 5 a 11 | 5 a 11 | 5 a |
| Amount produced in g. | 0.150 | 0.103 | 0.078 | 0.030 |
| Total 0.361 g | | | | |

Example No. 4

The present reactor can be used to obtain ceramic fibres other than carbon fibres. For example, using the mixture of gases and temperatures described by Motojima and Hasegawa (Journal of Crystal Growth, 87, (1988), 311–317), SiC fibres with the lengths and thicknesses described in the above examples for VGCF can be obtained. The operative conditions for this specific case are:

Metal salts are used as seeds.

The deposition temperature is kept between 1030° and 1200° C.

An atmosphere formed by $Si_2Cl_5$, $H_2$ and Ar with a C/Si ratio of 2 and a minimum of 10% of $H_2$ and a maximum of Ar of 40% is used.

DESCRIPTION OF THE FIGURES

FIG. 1

General diagram of the device for obtaining fibres
 (1) Hydrocarbon tank
 (2) Carrier and/or activator gas tank
 (3) Mixing and preheating chamber
 (4) Oven
 (5) Output where the inflammable gases are collected or destroyed
 (6) Screen from whose duly activated surface the carbon fibres grow

FIG. 2

Basic types of substrates
 (a) 18/8 stainless steel mesh
 (b) Rods with broadenings
 (c) Smooth rods
 (d) Perforated plates

FIG. 3

Diagram of the basic carbon fibre production unit
(1) Frame
(2) Mask
(3) Substrate

FIG. 4

Diagram of a group of units in tandem of an identical length
(1) Frame
(2) Mask
(3) Substrate
L, length the marks the maximum length of the fibre

FIG. 5

Diagram of a group of units in tandem with a decreasing length
(1) Frame
(2) Mask
(3) Substrate
$L_1, L_2, L_{n-1}, L_n$, lengths that mark the maximum fibre length in each unit $(L_1 > L_2 > \ldots > L_{n-1} > L_n)$

FIG. 6

Spiral substrate
In the bottom part of the Figure: Double spiral variant

FIG. 7

Different forms of masks

FIG. 8

Arrangement of the standard reactor
(1) Electric oven
(2) Gas output where they are burned by means of a burner

FIG. 9

Experimental assembly of multichambers of compartments of decreasing size
(1) Electric oven
(2) Gas output where they are burned by means of a burner
(3) Quartz preheated gas intake pipe
(4) Transparent quartz reactor
(5) Wire fabric frame
(6) Substrates
(7) Masks

I claim:

1. A reactor for producing ceramic fibers comprising:

a chamber having a first end and a second end, said chamber having an input means for permitting a gaseous mixture that includes hydrocarbon into said chamber, said input means being disposed at said first end, said chamber having output means for permitting said gaseous mixture out of said chamber, said output means being disposed at said second end;

means for heating said chamber;

at least one substrate being disposed in said chamber, said at least one substrate being disposed frontally to a flow of said gaseous mixture through said chamber; and a flow regulating mask being disposed in said chamber, said mask having means for improving the laminar property of said flow.

2. A reactor according to claim 1, wherein said at least one substrate is at least two pairs of substrates, a distance between each pair of adjacent substrates is substantially the same.

3. A reactor according to claim 1, wherein said at least one substrate is at least two pairs of substrates, a distance between a pair of adjacent substrates decreasing in the direction of flow through said chamber.

4. A reactor according to claim 1, wherein said flow regulating mask is disposed in said chamber adjacent to said first end.

5. A reactor according to claim 4, further including a second flow adjustment mask being disposed in said chamber adjacent to said second end, said mask having means for improving the laminar property of said flow.

6. A reactor according to claim 1, wherein said substrate is a perforated plate.

7. A reactor according to claim 1, wherein said substrate is a wire fabric.

8. A reactor according to claim 1, wherein said substrate is a wire spiral.

9. A reactor according to claim 1, wherein said substrate is a spiral wound wire about which a second spiral of finer wire is wound.

10. A reactor according to claim 1, wherein said substrate is made of metal.

11. A reactor according to claim 10, wherein said substrate is made of stainless steel.

12. A reactor according to claim 1, wherein said substrate is made of a ceramic material.

13. A reactor according to claim 12, wherein said substrate includes a plurality of one of grooves and perforations that has a toothed edge.

14. A reactor according to claim 4, wherein said mask is a perforated screen.

15. A reactor according to claim 1, wherein said substrate includes a means for being seeded with an additional substance to initiate the formation of fibers.

16. A reactor according to claim 1, wherein said at least one substrate includes a means for permitting ceramic fibers to grow thereon in a direction that is parallel to a direction of said flow.

* * * * *